United States Patent [19]
Hopkins

[11] 3,772,900
[45] Nov. 20, 1973

[54] TEMPERATURE CONTROLLER FOR FLUID IN AN APPARATUS HAVING A PLURALITY OF OPERATION CYCLES

[75] Inventor: Charles L. Hopkins, Norwood, Ohio

[73] Assignee: McGraw-Edison Company, Elgin, Ill.

[22] Filed: Mar. 2, 1972

[21] Appl. No.: 231,137

[52] U.S. Cl.................................. 68/12 R
[51] Int. Cl. ............................ D06f 33/02
[58] Field of Search................ 68/12 R; 307/116, 307/118

[56] References Cited
UNITED STATES PATENTS

| 2,819,540 | 1/1958 | Toma et al. | 68/12 R |
| 2,928,267 | 3/1960 | Frey et al. | 68/12 R |
| 3,477,258 | 11/1969 | Walker et al. | 68/12 R |
| 3,479,487 | 11/1969 | Stoll | 307/116 X |

*Primary Examiner*—John Petrakes
*Assistant Examiner*—Philip R. Coe
*Attorney*—Richard C. Ruppin

[57] ABSTRACT

A temperature controller for controlling the temperature of water in a washing machine during each one of the operation cycles of the washing machine. A separate circuit for each operation cycle of the machine is provided for producing a signal representative of a selected water temperature during that cycle. A single temperature indicating device indicates the water temperature during each one of the cycles and a single thermistor circuit produces a signal representative of the actual water temperature during each one of the cycles. The signal from the temperature selection circuit and the thermistor circuit is applied to a comparison means which produces an output signal dependent on a predetermined relationship of the two input signals and causes water of a temperature required to reach desired water temperature to be added to the washing machine. A programmer selects the cycle in which the washing machine is to operate and also actuates the temperature selection circuit which is to control the water temperature of the operation cycle selected. Actuation of any one temperature selection circuit produces an output which blocks any output from the other temperature selection circuits to the comparison means so that there will be no interference with the comparison of the signal from the actuated temperature selection circuit and the signal from the thermistor circuit.

7 Claims, 1 Drawing Figure

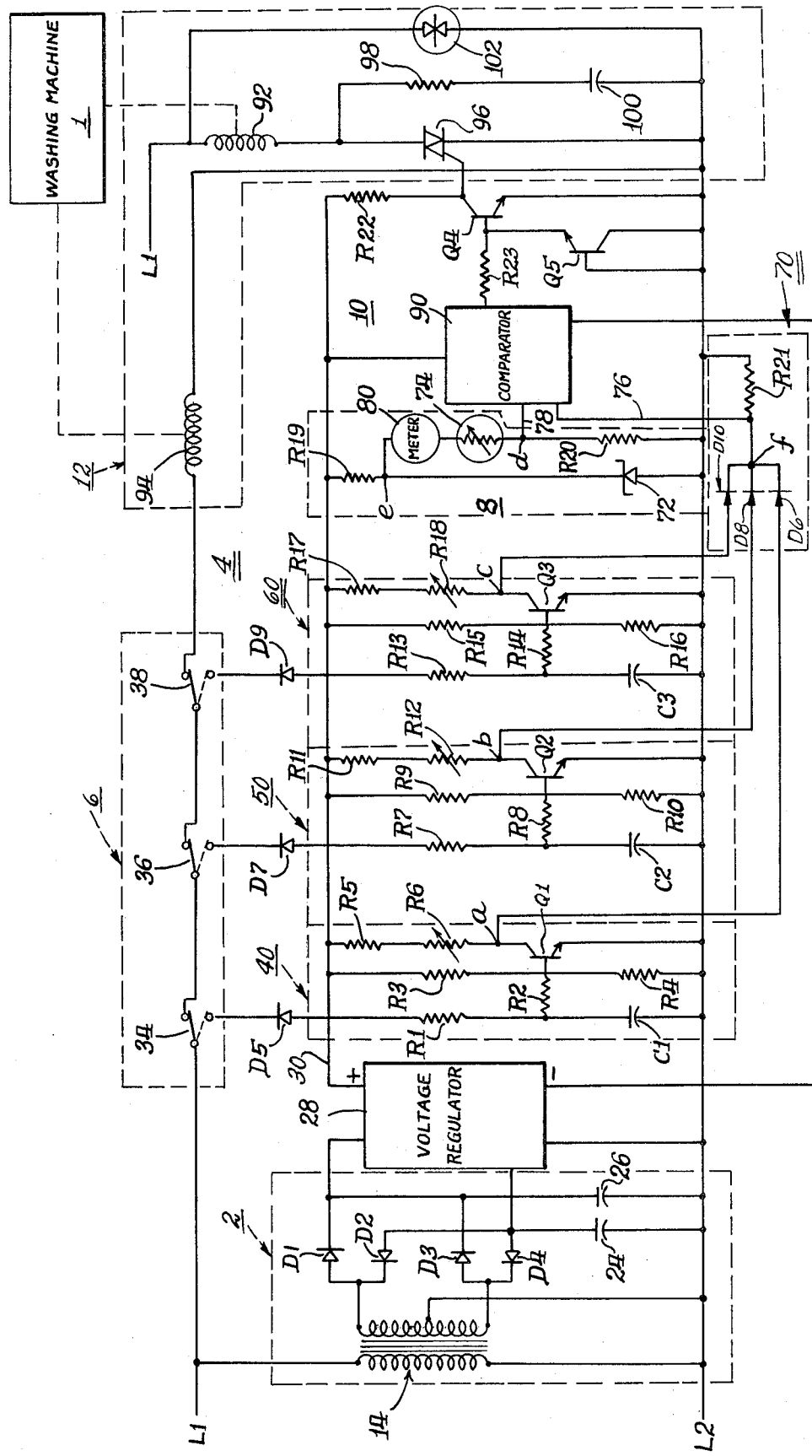

TEMPERATURE CONTROLLER FOR FLUID IN AN APPARATUS HAVING A PLURALITY OF OPERATION CYCLES

BACKGROUND OF THE INVENTION

This invention relates to a temperature controller for fluid in apparatus having a number of operation cycles and in particular to a temperature controller for water in a washing machine. Temperature controllers for water in industrial type washing machines typically use a different temperature control circuit for each operation cycle of the washing machine. These controls require a separate temperature sensing element such as a thermistor and all of its associated circuitry for sensing actual water temperature and attaining the desired water temperature. Use of such separate thermistors and related circuitry, of course, requires more space and adds to the cost of the washing machine. Further, present control circuits do not include circuit means for indicating actual water temperatures to personnel monitoring machine operation.

SUMMARY OF THE INVENTION

It is an object of the invention to provide a temperature controller for fluid in an apparatus having more than one operation cycle in which a substantial amount of the circuitry is commonly used to control and indicate the fluid temperature during each different operation cycle. It is a more specific object of the invention to provide an automatic water temperature controller for a washing machine having a plurality of operation cycles in which only a single thermistor and a single temperature indicating device are needed for sensing and indicating the temperature of the wash water during each operation cycle of the washing machine.

The objects of the invention are accomplished by providing a separate circuit for each operation cycle of the apparatus which produces an output signal representative of the desired fluid temperature for that cycle and which is operative to produce the signal only during the time the cycle takes place. A single thermistor is in contact with the fluid in the apparatus and, in combination with other appropriate circuit components, produces a signal representative of the actual temperature of the fluid during each cycle. A single temperature indicating device is in circuit with the thermistor and visually indicates the water temperature during each cycle.

A comparison means is arranged to receive the signal from the thermistor circuit and the signal representative of the desired fluid temperature during a cycle. Depending upon the relationship of the levels of the two signals, the comparison means is operative to produce an output signal which results in the adding of fluid permitting attaining the desired temperature to the fluid in the apparatus. The circuits producing the signal representative of the desired fluid temperature are arranged such that upon the production of the desired fluid temperature signal from any one of them, the others are inoperative to produce a signal to the comparison means. Thus, the thermistor circuit is cooperative with only one of the temperature selection circuits at any given time.

BRIEF DESCRIPTION OF THE DRAWING

The single FIGURE of the drawing is a schematic diagram of the temperature controller according to the instant invention.

DESCRIPTION OF THE PREFERRED EMBODIMENT

Referring to the figure, a temperature controller for an industrial washing machine 1 is shown as having a regulated DC power supply 2, first circuit means comprising a reference signal circuit 4, selector switch means 6, second circuit means comprising temperature sensing and indicating means 8, third circuit means comprising a comparison circuit 10, and water valve control means 12. The DC power supply 2 is connected to a source of AC power (not shown) via the lines L1 and L2. The DC power supply 2 includes a transformer 14, a rectifier comprising diodes D1, D2, D3 and D4 and filter capacitors 24 and 26. A voltage regulator 28 is also part of the regulated DC power supply 2 and provides a positive (+) and negative (−) DC voltage of an appropriate level respectively to the lines 30 and 32. The voltage regulator 28 is of a type well known in the art and consequently will not be discussed in detail.

The reference signal circuit 4 comprises three signal circuits respectively designated 40, 50 and 60. The signal circuit 40 comprises a transistor Q1 and a biasing network comprising capacitor C1, diode D5 and resistors R1, R2, R3 and R4. The signal circuit 40 also includes a reference voltage network comprising resistor R5, variable resistor R6, diode D6 and output terminal "a" between resistor R6 and the collector of transistor Q1. The signal circuit 50 comprises a transistor Q2 and a biasing network comprising capacitor C2, resistors R7, R8, R9 and R10. The signal circuit 50 also includes a reference voltage network comprising resistor R11, variable resistor R12, and output terminal "b" between resistor R12 and the collector of transistor Q2. The signal circuit 60 comprises a transistor Q3 and a biasing network comprising capacitor C3, and resistors R13, R14, R15, and R16. The signal circuit 60 also includes a reference voltage network comprising resistor R17, variable resistor R18, and output terminal "c" between resistor R18 and the collector of transistor Q3. The reference signal circuit 4 further includes a blocking circuit 70 comprising a resistor R21 and diodes D6, D8, and D10 all having their cathodes connected together at junction "f". As can be seen in the figure, the anodes of diodes D6, D8 and D10 are respectively connected to output terminals a, b, and c of the signal circuits 40, 50, and 60. The cathodes of diodes D6, D8 and D10 are connected through resistor R21 to line L2. Also, a line 76 is connected between the junction "f" and the comparator 10 for applying the signal appearing at any one of the terminals "a", "b", or "c" to the comparison means 10.

The selector switch means 6 comprises switches 34, 36, and 38. When these switches are in their full line positions as shown in the figure, they are in series with the line L1 connected to the AC power source. If any of the switches 34, 36, or 38 is switched to the dashed line position as shown in the figure, the AC power source is connected to one of the signal circuits 40, 50 or 60. The switches, 34, 36, and 38 are each in different tracks of a card programmer (not shown) that is used to control the formula and cycles of the industrial washing machine 1. Such a card programmer is well known in the art and will not be described herein.

The temperature sensing and indicating means 8 includes a constant voltage supply circuit comprising zener diode 72 and resistor R19. A thermistor 74, a temperature indicating meter 80 and a resistor R20 are connected in series to a terminal "e" between the zener diode 72 and the resistor R19. The thermistor 74 is in contact with water in the washing machine 1 and has an inverse temperature-resistance characteristic well known in the art. The junction "d" between thermistor 74 and resistor R20 is connected to the comparator 10. The thermistor 74 and meter 80 taken together and resistor R20 form a voltage divider which provides a voltage signal level to the comparator 10 which is dependent upon the resistance of the thermistor 74 and representative of the temperature of the water in the washing machine 1. If the temperature of the water in the washing machine 1 is low, the resistance of the thermistor 74 will be high so that the voltage signal level at the terminal "d" to the comparator 10 will be at a low level relative to the positive voltage on line 30. When the temperature of the water in the washing machine 1 is high, the resistance of the thermistor 74 is low so that the voltage signal level at terminal "d" is at a higher level and closer to the voltage level on line 30. The meter 80 will visually indicate the water temperature in response to the signal generated as the resistance of the thermistor 74 varies.

The comparison means 10 includes a comparator 90 connected to the positive DC line 30 and the negative DC line 32 and having inputs connected to lines 76 and 78. The comparison means 10 also includes a transistor Q4, a resistor R22 connected between the line 30 and the collector of transistor Q4 and a resistor R23 connected between the base of transistor Q4 and an output of comparator 90. A transistor Q5 is connected between the base of transistor Q4 and the AC power source line L2 for the purpose of clamping the negative voltage present at the base of Q4 to a safe value.

The water valve control means 12 includes a control relay coil 92, a control relay coil 94 and a triac 96. Also included as part of the water valve control means 12 is a resistor 98 and a capacitor 100 for shunting line voltage transients around the triac 96 and a thyrector 102 for additional surge voltage protection. As shown in the figure, the control relay coil 94 is connected in series with the switches 34, 36, and 38 between lines L1 and L2. The control relay coils 92 and 94 each have control contacts (not shown) which control the hot and cold water valves (not shown) and which may be located in the washing machine 1. The control connection of their contacts by the relay coils 92 and 94 is represented by the dashed lines between the coils and the washing machine 1 in the figure. The arrangement of the contacts is such that when switches 34, 36, and 38 are in their full line positions as shown in the figure, control relay 94 will be energized and its contacts will be positioned such that the contacts of control relay 92 will have no control over the water valves. The arrangement and operation of the control relay contacts and the water valves is well known in the art and therefore are not shown in the drawing and will not be further discussed herein.

In the operation of the temperature controller, when all of the switches 34, 36, and 38 are in their full line positions, the control relay coil 94 will be energized and the control relay coil 92 will have no control over the hot and cold water valves of the washing machine 1. In this condition, the circuits through the signal circuits 40, 50 and 60 between line L2 and line L1 are open. However, the circuit between line L2 and positive DC line 30 through resistors R2, R3, R4 and capacitor C1 in signal circuit 40 is closed. The circuit between line L2 and line 30 through resistors R8, R9, R10 and capacitor C2 in the signal circuit 50 is also closed as is the corresponding circuit in signal circuit 60. In this condition, the circuit components R2, R3, R4 and C1 in signal circuit 40 have values such that the signal at the base of transistor Q1 is sufficient to forward bias it. When transistor Q1 is conductive it completes a circuit between line 30 and line L2 through resistor R5, resistor R6 and the collector-emitter of transistor Q1. Thus, a signal normally appears at the output terminal a which is equal to the collector-emitter saturation voltage of Q1, considering the voltage on line L2 as a reference voltage. This collector-emitter saturation voltage is less than that required to forward-bias diode D6. The signal therefore on line 76 to the comparator 90 is very close to zero with respect to line L2. The operation of the remaining signal circuits 50 and 60 is identical to that of signal circuit 40 when switches 36 and 38 are in their full line positions and therefore the operation of signal circuits 50 and 60 during this condition of the temperature controller will not be also described.

The switches 34, 36, and 38 are normally controlled by the card programmer such that only one at a time of the switches 34, 36, and 38 is switched to its dashed line condition. For purposes of convenience, the dashed line condition of each switch will hereafter be referred to as the closed condition. Each one of the switches 34, 36, and 38 is utilized during a different one of the operation cycles of the washing machine. Thus, placing one of the switches in its closed condition permits water temperature control during the operation cycle associated with the closed switch. With the switch 34 in its closed condition, a circuit is completed through capacitor C1, resistor R1 and diode D5 between lines L1 and L2. Thus, during each negative half cycle of the AC power source on line L1, capacitor C1 is charged to a negative value which also appears at the base of transistor Q1. When capacitor C1 reaches a sufficient negative voltage level, transistor Q1 ceases to conduct, the level of the output voltage signal at terminal "a" will rise closer to the positive voltage on line 30 and this voltage level will appear through diode D6 on line 76 at the input of comparator 90. The level of this output voltage signal can be selected at a desired value by adjusting the variable resistor R6. The resistor R6 thus permits selection of the water temperature which is desired during operation of the washing machine 1 operation cycle associated with the signal circuit 40 and switch 34. The relatively positive signal level appearing at terminal "a" also appears at junction "f" and therefore at the cathodes of the diodes D8 and D10 respectively in the signal circuits 50 and 60. Since the normal voltage signal level at the anodes of diodes D8 and D10 is close to the reference voltage on line L2, diodes D8 and D10 will be reversed biased so that terminals "b" and "c" will be isolated from the comparator 90.

Assuming that the water in the washing machine 1 is at a low temperature at the start of a washing machine operating cycle when the switch 34 is placed in its closed condition, the thermistor 74 will have a high resistance value. Accordingly, the voltage signal level representative of the water temperature on line 78 to comparator 90 will be at a low level. Also assuming that the desired water temperature as selected by resistor R6 is higher than the actual water temperature at the start of the operation cycle, the level of the signal on line 76 to comparator 90 is higher than the signal on line 78. In this condition of the temperature controller, the comparator 90 produces an output through resistor R23 to the base of transistor Q4 sufficient to maintain transistor Q4 in a non-conductive condition. When transistor Q4 is not conducting, gating current for the triac 96 is obtained through resistor R22 from line 30. Thus, triac 96 is conductive so that relay coil 92 is energized. When energized, relay coil 92 controls its contacts to open the hot water valve and thereby raise the temperature in the washing machine. When the water reaches a temperature higher than the desired temperature, the resistance of thermistor 74 becomes low so that the level of the signal on line 78 to the comparator 90 becomes higher than the level of the signal on the line 76 to the comparator 90 from the terminal "a". The comparator 90 will then produce a positive output signal to the base of transistor Q4 which is sufficient to cause transistor Q4 to conduct and shunt the gating current to the gate of triac 96. Triac 96 then becomes non-conductive so that control relay coil 92 is deenergized. When the relay coil 92 is deenergized, the washing machine cold water valve is opened and cold water enters the machine until the thermistor 74 resistance changes to a value which results in the level of the signal on line 78 to comparator 90 again being lower than the level of the signal on line 76. The output of comparator 90 then again changes to a value sufficiently negative to cut off conduction of transistor Q4 and permit gating of triac 96 and resultant admission of hot water to the washing machine. It can thus be seen that as the temperature of the water in the washing machine varies about the preselected temperature point, the thermistor 74 will change its resistance value to provide a signal to the comparator 90 and the comparator 90 produces an output which will cause hot or cold water to be added to the washing machine to change the temperature of the water in the direction of the desired set temperature. Further, throughout the entire water temperature adjusting operation the meter 80 will be indicating the water temperature to thereby provide a check on the proper operation of the controller.

The other signal circuits 60 and 70 cooperate with the thermistor 74 and the comparison means 10 in a manner similar to that of signal circuit 40. The only difference in operation of signal circuits 50 and 60 is that their respective variable resistors R12 and R18 may be set for different desired water temperatures and therefore the level of the output reference signal at terminals "b" and "c" to line 76 will be different and a different signal level on line 78 to comparator 90 will be required to cause a change in the output signal level of the comparator 90 to the base of transistor Q4.

While only one specific embodiment of the invention has been shown herein, it will be realized that many modifications thereof are feasible without departing from the spirit and scope of the invention. For example, the disclosed temperature controller could be used in any type of apparatus utilizing a fluid or fluids during more than one operating cycle. Also, the entire controller can readily be modified to utilize a DC supply voltage without departing from the scope of the invention. It is accordingly intended that the scope of the invention is not to be limited to the specific embodiment disclosed.

I claim:

1. In a washing machine having a plurality of different operation cycles, a control circuit for controlling the temperature of water in the washing machine comprising:

a reference signal circuit comprising a different circuit means for each one of said operation cycles, each circuit means normally producing a first output and being controllable to produce a second output comprising a reference signal;

switch means connected to the reference signal circuit for selectively controlling only one of said circuit means to produce said second output and the remaining of the circuit means to produce the first optput;

sensing means for sensing and indicating the temperature of the water in the washing machine during each different operation cycle and producing a signal representative of the water temperature; and comparison means connected to the reference signal circuit and the sensing means for comparing the second output of any one of the circuit means and the signal of the sensing means and producing an actuating signal when said second output and the signal of the sensing means have a predetermined relationship.

2. The combination according to claim 1 wherein all of said circuit means are interconnected, and the first output of each circuit means is blocked in response to the second output of another circuit means.

3. The combination according to claim 1 wherein said reference signal circuit includes blocking means connected to each of said circuit means and to said comparison means, said blocking means being responsive to the second output of any of the circuit means to block the first output of the remaining circuit means from the comparison means.

4. The combination according to claim 3 wherein said blocking means comprises a different diode for each circuit means, each diode being connected between one circuit means and all of the other circuit means, each diode being reverse biased in response to the first output of said one circuit means and the second output of any of the other circuit means.

5. The combination according to claim 1 wherein said sensing means comprises:

a single thermistor means in contact with said water for producing said signal representative of the water temperature; and a single indicating means responsive to said signal produced by the thermistor means for visually indicating the temperature of the water.

6. The combination according to claim 1 wherein:

each circuit means comprises a switch having a normally conductive condition and a non-conductive condition, each circuit means producing said first output when the switch is conductive and said second output when the switch is non-conductive; and each switch is non-conductive in response to said switch means.

7. The combination according to claim 6 wherein each circuit means includes an independently adjustable variable resistor for controlling said second output.

* * * * *